United States Patent
Plozner (10) Patent No.: US 9,109,367 B2
(45) Date of Patent: Aug. 18, 2015

(54) THERMAL INSULATION COMPOSITE SYSTEM, BUILDING COMPRISING SUCH A SYSTEM AND METHOD FOR PRODUCING A THERMAL INSULATION COMPOSITE SYSTEM

(75) Inventor: Fabrizio Plozner, Zurich (CH)

(73) Assignee: TheSwix Innovation AG (CH)

( * ) Notice: Subject to any disclaimer, the term of this patent is extended or adjusted under 35 U.S.C. 154(b) by 0 days.

(21) Appl. No.: 14/238,435

(22) PCT Filed: Aug. 6, 2012

(86) PCT No.: PCT/CH2012/000181
§ 371 (c)(1),
(2), (4) Date: Apr. 2, 2014

(87) PCT Pub. No.: WO2013/023312
PCT Pub. Date: Feb. 21, 2013

(65) Prior Publication Data
US 2014/0202104 A1    Jul. 24, 2014

(30) Foreign Application Priority Data
Aug. 12, 2011  (EP) ..................................... 11405299

(51) Int. Cl.
| E04B 2/86 | (2006.01) |
| E04F 13/08 | (2006.01) |
| E04B 1/76 | (2006.01) |
| E04F 13/075 | (2006.01) |

(52) U.S. Cl.
CPC ............. *E04F 13/0801* (2013.01); *E04B 1/762* (2013.01); *E04F 13/075* (2013.01); *Y02B 30/94* (2013.01); *Y10T 29/49826* (2015.01)

(58) Field of Classification Search
CPC ..... E04B 2/8652; E04B 1/4178; E04F 13/0803
USPC .......... 52/506.05, 509, 510, 513, 235, 309.11
See application file for complete search history.

(56) References Cited

U.S. PATENT DOCUMENTS 1,052,670 A * 2/1913 Francis ........................... 52/509
1,483,941 A * 2/1924 Kasson ........................... 52/273
(Continued)

FOREIGN PATENT DOCUMENTS

| DE | 10 2007 048 802 A1 | 4/2009 |
| EP | 1 818 467 A2 | 8/2007 |
| WO | 2009/127032 A1 | 10/2009 |

OTHER PUBLICATIONS

International Search Report of the corresponding International Application, PCT/CH2012/000181 dated Jan. 30, 2013.

*Primary Examiner* — Jeanette E Chapman
*Assistant Examiner* — Daniel Kenny
(74) *Attorney, Agent, or Firm* — Cowan, Liebowitz & Latman, P.C.; Mark Montague (57) ABSTRACT

The invention relates to a thermal insulation composite system, comprising a plurality of panel-shaped thermal insulating bodies and a plurality of fixing devices for fixing the thermal insulating bodies to an external wall of a building, wherein each of the fixing devices contains a fixing plate for fixing the fixing device to the outer wall, a connecting bridge mounted on the surface side of the fixing plate, and an insert plate that is fixed to the fixing plate via the connecting bridge in a plane substantially parallel to the fixing plate. At least a first portion of the insert plate is designed for relative engagement in the first slot of at least a first of the thermal insulation bodies. The connecting bridge is designed for complete relative engagement in a second slot of the at least one first thermal insulation body, said second slot corresponding to the thickness of the connecting bridge.

22 Claims, 2 Drawing Sheets

(56) References Cited

U.S. PATENT DOCUMENTS

| | | | |
|---|---|---|---|
| 2,245,785 A * | 6/1941 | Jentzer, Jr. | 52/416 |
| 4,889,310 A * | 12/1989 | Boeshart | 249/41 |
| 5,039,058 A * | 8/1991 | Boeshart | 249/194 |
| 5,704,180 A * | 1/1998 | Boeck | 52/426 |
| 6,324,804 B1 * | 12/2001 | Hoogstraten | 52/426 |
| 2006/0059822 A1 * | 3/2006 | Guffey | 52/480 |

* cited by examiner

THERMAL INSULATION COMPOSITE SYSTEM, BUILDING COMPRISING SUCH A SYSTEM AND METHOD FOR PRODUCING A THERMAL INSULATION COMPOSITE SYSTEM

CROSS REFERENCE TO RELATED APPLICATIONS

This is a U.S. national stage of application No. PCT/CH2012/000181 filed on Aug. 6, 2012. Priority under 35 U.S.C. §119(a) and 35 U.S.C. §365(b) is claimed from European Patent Application No. 11405299.6 filed on Aug. 12, 2011, the disclosure of which is also incorporated herein by reference.

The invention relates to a thermal insulation composite system according to claim 1, to a building according to claim 24, and to a method for producing a thermal insulation composite system according to claim 25.

Thermal insulation composite systems are known in which a plurality of thermal insulation bodies, arranged one beside the other and one on top of the other, are fixed to an external wall of a building. Fixing takes place by means of adhesives and/or anchors, for example thermal insulation anchors, on the existing substrate of the external wall, for example brick, sand-lime brick or concrete. Subsequently, the outward-facing surface of the thermal insulation composite system is provided with a reinforcement layer. The reinforcement layer comprises a reinforcement mortar in which a woven reinforcement material is embedded. The woven reinforcement material is arranged in the upper third of the reinforcement layer. External rendering forms the final layer of the system.

It has been shown to be disadvantageous in that the bonding of the individual thermal insulation bodies is very time-consuming. Furthermore, the external wall needs to be substantially free of any unevenness. There is a further disadvantage in that an incorrectly bonded thermal insulation body can no longer be removed from the external wall without being destroyed.

Furthermore, fixing the individual thermal insulation bodies needs to take place very reliably so that the thermal insulation composite system can withstand even major wind suction loads. To this effect usually, in addition, so-called thermal insulation anchors are inserted through the individual thermal insulation bodies and then for fixing are knocked into holes that were previously drilled into the external wall. After it has been knocked in, the usually plate-shaped fixing head of these thermal insulation anchors comes to rest against the outside of the thermal insulation bodies.

The above is disadvantageous in that thermal bridges arise by way of the thermal insulation anchors, which thermal bridges impair the thermal insulation properties of the thermal insulation composite system. There is a further disadvantage in that the thermal insulation anchors need to be knocked to a substantial depth into the masonry of the external wall of the building, or that very deep holes need to be drilled into the masonry. This work is strenuous and time-consuming. Furthermore, in particular in the case of old buildings, the masonry is negatively affected to a substantial degree. There is a further disadvantage in that over time the plate-shaped fixing heads start to show on the finished rendered surface. Moreover, it is disadvantageous that in particular on the edge region of buildings with a height to eaves exceeding 20 m (as a result of the substantial wind suction loads expected in such situations) anchoring requires 6 to 10 anchors/m². This extensive anchoring work is thus time-consuming and overall very expensive.

A thermal insulation composite system is known in which thermal insulation bodies are fixed by means of thermal anchors, wherein the thermal insulation bodies at the respective fixing positions are equipped with a usually circular opening. In this arrangement in each instance the diameter of this opening is larger than the diameter of the fixing head of a respective thermal anchor. The thermal anchor is subsequently knocked into the masonry of the external wall of the building to such a depth that the thermal head has been entirely made in the opening and comes to rest against the material of the thermal insulation body. After the thermal anchor has been incorporated, the recess with a suitable closing element, which comprises a material that corresponds to the material of the thermal insulation body, is inserted into the opening. For example, this closing element is inserted into the recess to such a depth that the external surface of said closing element is flush with the external surface of the thermal insulation body. The closing element can be bonded to the thermal insulation body. This is associated with a disadvantage in that the recesses have to be made on site in the material of the thermal insulation body. This work is time-consuming. There is a further disadvantage in that the effective insulation thickness of the thermal insulation body in the region of the recess is inevitably reduced. Consequently the insulation properties are impeded.

There is a further disadvantage of fixing the thermal insulation bodies to the external wall by means of thermal anchors in a thermal insulation composite system from the state of the art in that thermal insulation bodies of different thicknesses also require the use of thermal anchors of different lengths. Thus thermal anchors of different lengths need to be produced, kept in stock and offered, which overall increases costs.

A further technique for fixing thermal insulation bodies of a thermal insulation composite system to external walls of a building consists of the use of so-called mounting rails. DE 299 11 643 U1 shows such a mounting rail, which is designed as an angled-profile rail. This rail comprises a fixing leg for fixing to an external wall. Furthermore, a holding leg, spaced apart from the fixing leg, is provided for engaging in a slot of a thermal insulation body. The fixing leg and the holding leg are interconnected by way of a yoke.

Figure 1:
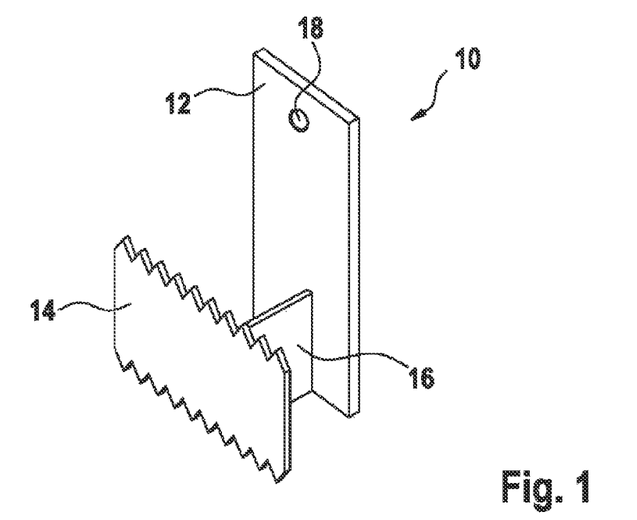
FIG. 1 a perspective view of a fixing device.

FIG. 1 of this printed publication DE 299 11 643 U1 shows the mounting rail fixed to an external wall. The diagram shows that the fixing leg is designed at the same time to engage in the slots of adjacent thermal insulation bodies. In the installed state of the thermal insulation bodies on the mounting rails, first portions of the adjacent thermal insulation bodies, which portions in each case extend between the slot and the surface of each thermal insulation body, which surface faces the external wall, are separated from each other by the yoke.

Known thermal insulation composite systems are associated with a disadvantage in that between second portions of adjacent thermal insulation bodies, which portions in each case extend between the slot and the surface of each thermal insulation body, which surface faces away from the external wall, an air gap is formed. In this arrangement the width of this air gap, i.e. the space between the above-mentioned second portions of adjacent thermal insulation bodies, corresponds to the thickness of the yoke. The air gaps between respectively adjacent thermal insulation bodies in each case form thermal bridges. There is a further disadvantage in that the insulation between the respective first portions of the adjacent thermal insulation bodies is only formed by the material of the yoke. Since the material of the yoke does not provide any insulating properties, there is simply no insulation at these locations, and consequently the thermal bridge overall extends through the entire material thickness of the individual thermal insulation bodies. Consequently the thermal insulation properties of the entire thermal insulation composite system are diminished.

There is a further problem in that such a fixing of the mounting rail to the external wall, in which fixing the yoke deviates even slightly from the horizontal alignment, results in the alignment of the thermal insulation body mounted thereon directly following this deviation. This is due to the fact that the entire surface of the yoke rests against the respective surface areas of the top and/or the bottom of a thermal insulation body mounted thereto, thus pressing said thermal insulation body into position. The alignment of the yoke thus inevitably predetermines the alignment of the particular insulation body being installed. When viewed over the entire length of an external wall, this deviation continues in a leveraged manner over all the thermal insulation bodies. This is associated with a disadvantage in that deviations from the horizontal or from the vertical arrangement of the thermal insulation bodies result in increased gap dimensions between adjacent thermal insulation bodies, which impedes the thermal insulation properties. In order to prevent this problem from occurring, in turn the individual mounting rails would have to be fixed to the external wall with a horizontally very precisely aligned yoke. However, the particularly precise work required for this is very time-consuming and can be carried out only by specially skilled professional personnel.

It is the object of the present invention to create a thermal insulation composite system that can be installed quickly and easily, that is cost effective, and that provides improved thermal insulation properties.

This object is met by a thermal insulation composite system according to claim 1.

The connecting bridge does thus not have any interfering effect in the endeavour to seamlessly interconnect the thermal insulation bodies. This amazingly simple solution provides a very important advantage in that adjacent thermal insulation bodies, for example thermal insulation bodies arranged one on top of the other, rest completely against each other in the fixed state. Without any gap, the insulation materials of the thermal insulation bodies seamlessly join one another, thus forming a large-area and uniformly closed insulation body that provides outstanding thermal insulation properties.

Moreover, minor deviations from the precisely horizontal or vertical alignment of the fixing device during fixing to the external wall do not result in deviations from the precisely horizontal or vertical alignment of the thermal insulation bodies. Instead, mutual readjustment of the individual thermal insulation bodies is now possible even in the state when they are installed on the fixing device. Thus the formation of gaps between respective thermal insulation bodies is excluded. This provides a further advantage in that the fixing device can very simply and quickly be fixed to the external wall.

Furthermore, particularly reliable adhesion of the thermal insulation bodies among themselves and at the same time to the external wall is created. Furthermore, due to its simple design the fixing device can be mass-produced very simply and economically.

Preferably, the connecting bridge of the fixing device is designed, with complete engagement in the second slot of the at least one first thermal insulation body, to finish flush with a top of the at least one first thermal insulation body. This ensures that the volume of the recess is kept as small as possible. Thus as little insulation material as possible is removed, which overall contributes to improving the thermal insulation properties.

Preferably, the connecting bridge of the fixing device is designed, with complete engagement in the second slot of the at least one first thermal insulation body, to come to rest against the bottom of the second slot that can be made in the thermal insulation body. This, too, ensures that the volume of the recess is kept as small as possible in that as little insulation material as possible is removed. Thus, overall, outstanding thermal insulation properties are ensured.

Preferably, the length of the connecting bridge of the fixing device ranges between 4 cm and 6 cm. There is an advantage in that the length of the connecting bridge, or respectively the distance from the fixing device to the insert plate, which is aligned so as to be parallel to the aforesaid, over a plurality of fixing devices, can always be constant, also for fixing different thermal insulation bodies, whose thicknesses, materials or further properties differ. This advantage also relates to the constant position of the first and/or of further slots, aligned parallel in relation to the external wall, of the thermal insulation body, which slots can be made or have been made in the material of the thermal insulation body. Analogously to this, overall, the fixing device provides an advantage in that even with the fixing of different thermal insulation bodies, which, for example, differ in thickness, for example being 80 mm, 100 mm, 120 mm, 140 mm or 160 mm, etc., and/or differ in their materials, for example being polystyrene, polyurethane, foam glass, mineral wool, etc., it is always possible to use fixing devices of identical dimensions. This is in contrast to fixing known from the state of the art by means of thermal anchors, which anchors with different thicknesses of the thermal insulation bodies need to be of different lengths. The fixing device according to the invention is associated with an advantage in that it can be mass-produced with almost unchanged dimensions, and consequently the overall production costs of the fixing device according to the invention are reduced. In view of this the costs associated with transport, stock keeping and inventory control are also reduced.

Preferably, the insert plate is designed in such a manner that with complete engagement in the at least one first thermal insulation body a second portion of the insert plate projects beyond an area of the thermal insulation body. As a result of this design the fixing device can at the same time hold several thermal insulation bodies.

Further preferably, the second portion of the insert plate is designed for relative engagement in a slot of at least one second thermal insulation body, which slot substantially corresponds to the thickness of the insert plate, which second thermal insulation body can be placed above or below the first thermal insulation body. This is associated with an advantage in that the fixing device thus, for example, can hold the top of a first thermal insulation body and at the same time the bottom of a second thermal insulation body, which is joined above the aforesaid. In this manner overall the number of necessary fixing devices to form a thermal insulation composite system can be reduced, which provides advantages in terms of reduced installation times and reduced costs. The first and/or second slot can be made in the material of the thermal insulation body during the production process. As an alternative, the first and/or the second slot can be made in the material on site, for example on the construction site.

Preferably, the connecting bridge is designed so as to be plate-shaped. This embodiment ensures a reliable connection between the fixing device and the insert plate with minimum use of material. In particular, forces which during the relative introduction of the insert plate into the slot of the thermal insulation body or during the placement of the thermal insulation body act on the insert plate of the fixed fixing device are transferred directly to the fixing device without the plate-shaped connecting bridge bending in the direction of the action of force. Furthermore, a fixing device designed in such a manner can be produced particularly easily and economically. The slot that can be made in the thermal insulation body, which slot is designed as an opening, can be made on site by means of a cutting tool. Thus the fixing position of the fixing device on the external wall in the horizontal direction can be flexibly selected. A template can be used in support of the incorporation of the slot, which is designed as an opening, in the thermal insulation body.

Preferably, in a state of the fixing device, in which state said fixing device is fixed to the external wall, the respective bottom of the fixing plate and/or of the plate-shaped connecting bridge and/or of the insert plate finish/finishes off so as to be flush relative to each other. Such a construction ensures reduced expenditure of time and material during production of the fixing device.

Preferably, the distance between the surface of the fixing plate and the surface of the insert plate corresponds to the length of the second slot that can be made in the thermal insulation body. This design ensures that the thermal insulation body in its state inserted in the fixing device is held, particularly reliably and without any play, between the coplanar surfaces of the fixing plate and of the insert plate.

Preferably, in a state in which the fixing device is fixed to the external wall, the insert plate comprises triangular openings at the top and/or at the bottom. For example, the top and/or bottom can be designed so as to be continuously serrated. This design allows particularly simple and quick introduction of the insert plate into the first slot of the thermal insulation body, or particularly simple and quick placement of the first slot of the thermal insulation body above the insert plate. Furthermore, this design makes it possible to incorporate markings in the surface of the thermal insulation body, in that the fixing device with the serrated top and/or bottom of the insert plate prior to installation is pressed against the thermal insulation body. The respectively serrated side then leaves markings on the thermal insulation body, by means of which markings the position of the first slot that can be made in the material of the thermal insulation body can be determined. The slot can be made on site in the material of the thermal insulation body, for example by means of a knife with, for example, a grooved or ribbed blade. As an alternative, the slot can be made in the material during the process of producing the thermal insulation body.

Preferably, the connecting bridge, in a state of the fixing device fixed to the external wall, is formed on the bottom comprising triangular openings. For example, in a manner similar to that of the previous embodiment, the bottom of the connecting bridge can be continuously serrated. This embodiment makes possible the particularly simple and fast introduction of the connecting bridge into the corresponding opening of the thermal insulation body. This embodiment furthermore makes it possible to incorporate markings on the surface of the thermal insulation body, in that the fixing device with the serrated bottom of the connecting bridge is pressed against the thermal insulation body prior to installation. The serrated bottom then leaves markings on the thermal insulation body, by means of which markings the position of the opening that can be made in the material of the thermal insulation body can be determined. The opening can be made on site in the material of the thermal insulation body, by means of a knife with, for example, a grooved or ribbed blade.

Preferably, the fixing plate comprises at least one hole through which a fixing element for fixing the fixing device to the external wall can be inserted. In this manner the fixing plate can be fixed quickly, simply and economically to the external wall, for example by means of a screw-anchor arrangement or a knock-in anchor.

Preferably, the insert plate of the fixing device comprises through-holes for the removal of water vapour formed by water vapour diffusion. By providing the through-holes, the collection of water within the thermal insulation body is prevented.

Preferably, the fixing device comprises metal or plastic. In the case of the use of metal, stainless steel is preferred in order to prevent corrosion. Advantageously the fixing device can be produced by means of the punching and chamfering of a correspondingly prepared metal plate. In the case of the use of plastic as a material of the fixing device a long service life is ensured. Furthermore, the material costs are kept low. For example polycarbonate can be used in the production of the fixing device.

Preferably, the insert plate of the fixing device measures between 8 cm and 12 cm in length and between 4 cm and 6 cm in width. An insert plate with such dimensions has been shown to be particularly advantageous in terms of the use of materials. It goes without saying that fixing devices with insert plates of different dimensions are imaginable.

Preferably, the connecting bridge of the fixing device is connected to the insert plate in the centre of said insert plate. Such a symmetrical design ensures favourable production costs.

Alternatively preferably, the connecting bridge is connected to the insert plate so as to be offset between 1 cm and 2 cm relative to the centre of said insert plate. Such an embodiment takes into account the need to prevent the connecting bridge of the fixing device from being positioned in the middle of two horizontally adjacent thermal insulation bodies. Instead, it is preferred if the connecting bridge is incorporated to the left or right of a thermal insulation body at a distance of at least 1 cm from the lateral edge of the thermal insulation body in a respectively corresponding opening. This prevents the respective horizontally adjacent thermal insulation bodies being spaced apart at a distance corresponding to the thickness of the material of the connecting bridge, which spacing would form a thermal bridge. When the above is observed, the thermal insulation bodies are always arranged seamlessly relative to each other, even in horizontal alignment, which ensures satisfactory insulation. As a result of the above-mentioned positioning of individual fixing devices near the lateral edge of a respective thermal insulation body a single fixing device can in a preferred manner hold the corner regions of three individual thermal insulation bodies that are arranged in a row horizontally offset relative to each other. Taking into account this manner of arranging the thermal insulation bodies, the number of necessary fixing devices can be reduced. Consequently the costs and the installation time are reduced. With regard to the above it is preferred to connect the connecting bridge to the insert plate so that the connecting bridge is offset by between 1 cm and 2 cm relative to the centre of said insert plate. Consequently, even in the case of an arrangement of the fixing device, which arrangement is offset relative to the lateral edge of a thermal insulation body, at the same time portions of identical length of the insert plate of the individual fixing device are incorporated in two horizontally adjacent thermal insulation bodies. Consequently, overall, the best-possible fixing can be achieved.

The thermal insulation body can, for example, be prepared so as to comprise a slot at its top and/or bottom. The opening for receiving the connecting bridge can, for example, be made in situ, at the place of installation, in the thermal insulation body. As an alternative, the slot can be made in the thermal insulation body during manufacture of said thermal insulation body.

Preferably, the thermal insulation body is manufactured from synthetic organic insulation materials, in particular polystyrene hard foam, polystyrene particle foam, polystyrene extruder foam, polyurethane hard foam and the like, or from synthetic inorganic insulation materials, in particular mineral wool, mineral foam, foam glass and the like. These materials provide outstanding thermal insulation characteristics. Furthermore, the thermal insulation body can, in addition or as an alternative, be designed for sound insulation. Moreover, thermal insulation bodies can be used with a coating. The advantage of the invention comes to pass in particular with thermal insulation bodies with a material comprising foam glass. In particular, due to their outstanding thermal insulation properties or their reduced thickness when compared to conventional thermal insulation bodies, these thermal insulation bodies are increasingly being used. However, no through-holes should be made in these thermal insulation bodies, for example for through-insertion of a thermal anchor from the state of the art as described above. Making a through-hole in a thermal insulation body comprising a coating would drastically impede the thermal insulation properties of this thermal insulation body. Making a through-hole in a thermal insulation body of a material comprising foam glass would inevitably result in its destruction. In contrast to this, the present invention allows reliable fixing of thermal insulation bodies without the need to make through-holes in them. Thus the above-mentioned disadvantages from the state of the art are advantageously avoided.

Preferably, the plurality of thermal insulation bodies are arranged one on top of the other and one beside the other. Such a thermal insulation composite system can quickly, simply and economically be fixed to the external wall and/or the internal wall and/or the ceiling (substratum) of a building. At the same time the thermal insulation composite system ensures outstanding thermal insulation properties. Thus the expenditure relating to the heating energy used in the building can be reduced.

Preferably, the thermal insulation composite system furthermore comprises at least one insulation element that is positioned in a region between the thermal insulation bodies, arranged one on top of the other and/or one beside the other, and the external wall. Consequently, because of the alternatingly arranged insulation elements, any air circulation in a region (hollow space) between the thermal insulation bodies and the external wall is prevented. This is associated with an advantage in that the thermal insulation properties are thus further improved. There is a further advantage in that, in the case of a fire, oxygen is supplied only to a reduced extent to the source of the fire, and furthermore the escape of toxic fumes is reduced.

Preferably, the insulation element is made from a tubular elastic material that is designed to be elastically clamped in a space between the thermal insulation body and the external wall of the building. This embodiment is associated with an advantage in that the insulation element is self-retaining as a result of the clamping force alone. Furthermore, readjustments can be made at any time.

Alternatively preferably, the insulation element is made from an elastic material that at least on one side comprises an adhesive surface, wherein the insulation element is designed, by means of the adhesive surface, to be bonded to a surface of the thermal insulation body, which surface faces the external wall of the building. This embodiment is associated with an advantage in that the insulation element can already be bonded to the thermal insulation bodies prior to installation of said thermal insulation bodies. For example, the insulation element can be bonded along the edge region of the individual thermal insulation bodies.

Preferably, the thermal insulation composite system further comprises a support wedge that is designed to be placed between the fixing plate and the external wall of the building in order to set an angle between the fixing plate and the external wall of the building. Thus, the fixing devices can be precisely positioned and aligned separately of each other so that later on the external surfaces of the individual thermal insulation bodies are always aligned so as to be flush with each other. Furthermore, tilting of individual thermal insulation bodies relative to each other is avoided, which tilting would diminish the thermal insulation properties of the entire thermal insulation composite system.

The above-mentioned object is furthermore met by a building according to claim 24. A thermally insulated building comprising a thermal insulation composite system according to any one of claims 1 to 23 provides outstanding thermal insulation properties created in a short time and economically with very modest use of materials. Consequently the building can be heated with a reduced energy input, because the heat within the building escapes only at a very reduced rate to the surroundings by way of the external walls. Therefore costs are saved and relevant energy saving guidelines, for example guidelines relating to the "Minergie" construction standard (sustainability brand for buildings with low energy consumption), are met.

The above-mentioned object is furthermore met by a method for producing a thermal insulation composite system according to any one of claims 1 to 23. In this method the at least one second slot is made on site, for example on the construction site, in a respective thermal insulation body. This can be supported with the use of a prepared template that is placed against the thermal insulation body and can be used to guide a knife by means of which the second slot is made in the material of the thermal insulation body. As an alternative, the opening can already have been made in the material of the thermal insulation body during production of said thermal insulation body. Furthermore, the fixing device and the thermal insulation body are brought into relative engagement so that the fixing plate engages in the first slot, and the connecting bridge completely engages in the second slot. Furthermore, the fixing plate of the fixing device made to engage in the thermal insulation body is fixed to the external wall of the building.

Below, the invention is explained in more detail with reference to an exemplary embodiment. The following are shown.

FIG. 1 shows a perspective view of a fixing device 10. The fixing device 10 comprises a fixing plate 12 for fixing the fixing device 10 to an external wall of a building (not shown). An insert plate 14 is connected to the fixing plate 12 by way of a connecting bridge 16, wherein the plates 12, 14 are arranged so as to be coplanar. The insert plate 14 is used for relative engagement, at least in some portions, in a slot (not shown) made in a thermal insulation body (also not shown). Thus the insert plate 14 and the slot can be made to establish relative engagement.

In this context the term "relative engagement" on the one hand refers to the insert plate 14 being able to be introduced into the slot of a (static) thermal insulation body. On the other hand, the above-mentioned term relates to a thermal insulation body being able to be placed onto the (static) insert plate 14 by way of its slot in said thermal insulation body.

The fixing plate 12 comprises a hole 18, through which a fixing element (not shown) can be introduced for fixing to the external wall. The relative engagement between the slot of a respective thermal insulation body and the insert plate 14 is further supported in that the bottom and/or top longitudinal side of the insert plate 14 are/is designed so as to be serrated.

Figure 2:
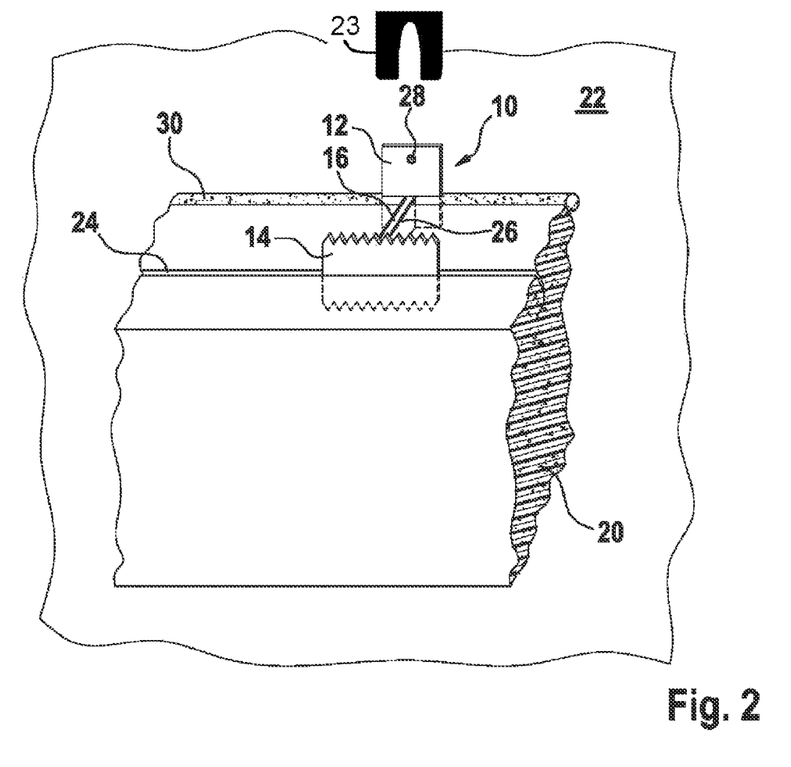
FIG. 2 a portion of a thermal insulation body that by means of a fixing device is fixed to the external wall of a building.

FIG. 2 diagrammatically shows a portion of a thermal insulation body 20 fixed to an external wall 22 of a building by means of the fixing device 10 shown in FIG. 1. At the top of the thermal insulation body 20 a slot 24, which extends in the longitudinal direction, has been made in the material of the thermal insulation body 20. A bottom (first) portion of the insert plate 14 has been inserted in the slot 24. In this arrangement the thickness of the slot 24 corresponds to the thickness of the insert plate 14. This ensures a firm hold between the fixing device 10 and the thermal insulation body 20.

The connecting bridge 16 in turn is fully inserted in an opening 26 of the thermal insulation body 20, which opening 26 has been made in the thermal insulation body 20 or can be made on site. In this arrangement no portion of the connecting bridge 16 projects above the top of the thermal insulation body 20. This prevents a gap forming between this thermal insulation body 20 and a further thermal insulation body (not shown) placed above said thermal insulation body 20. In other words, it is thus ensured that thermal insulation bodies arranged one on top of the other seamlessly adjoin each other without there being any gap. This arrangement ensures outstanding thermal insulation properties.

By way of an example, the connecting bridge 16 can be designed as a plate-shaped body whose bottom finishes off so as to be flush with the bottom of the insert plate 14. In this example the opening 26 is designed as a slot whose thickness corresponds to the thickness of the plate-shaped connecting bridge 16. Furthermore, in this example this slot (opening 26) and the slot 24 have been made in the material of the thermal insulation body 20 to an identical depth. Furthermore, the top of the connecting bridge 16 finishes off so as to be flush with the top of the thermal insulation body 20. Thus the material removal for making the opening 26 is reduced to a minimum, and consequently the thermal insulation properties are maximised. In addition, a firm hold between the fixing device 10 and the thermal insulation body 20 is ensured.

The slot, which has been made in the thermal insulation body 20 as an opening 26, extends continuously from the slot 24 to the surface of the thermal insulation body 20, which surface in the installed state points towards the external wall 22. In this arrangement the length of the slot made as an opening 26 corresponds to the distance between the surfaces of the insert plate 14 and the fixing plate 12. Thus, material portions of the top of the thermal insulation body 20 are firmly clamped between the insert plate 14 and the fixing plate 12. This ensures a further firm hold between the fixing device 10 and the thermal insulation body 20.

As diagrammatically shown in the figures, the bottom (first) portion of the insert plate 14 engages in the slot 24 of the thermal insulation body 20. An upper (second) portion of the insert plate 14 projects beyond the top of this thermal insulation body 20. This upper portion of the insert plate 14 can in turn be made to engage in a slot of a further thermal insulation body (neither of them shown), which thermal insulation body is to be placed above the thermal insulation body 20. By means of this function of double engagement, overall the number of fixing devices necessary can be reduced. Consequently, installation time and costs are saved. For fixing a bottom (first) layer of thermal insulation bodies it can be provided that these thermal insulation bodies in each case at their bottom are also provided with an opening for receiving a connecting bridge and a slot for receiving an insert plate of a fixing device. In this arrangement only these fixing devices, which are to be installed in the bottom region of the external wall, are designed in such a manner that the top and bottom of the insert plate finish so as to be flush with the top and bottom of the connecting bridge.

As shown in FIGS. 1 and 2, the top and bottom longitudinal sides of the insert plate 14 are designed so as to be serrated. As a result of this embodiment the relative engagement between the slots of respective thermal insulation bodies and the insert plate 14 are facilitated. As a result of the serrated shape the serrations engage in the usually elastic material of the thermal insulation body, thus securing said thermal insulation body more reliably against longitudinal displacement in the horizontal direction. Furthermore, the fixing plate 12 comprises a hole (shown in FIG. 1) through which a fixing element 28 has been inserted for fixing to the external wall 22. A support wedge 23 (shown in FIG. 2) is designated to be placed between the fixing plate 12 and the external wall 22 of the building in order to set an angel between the fixing plate and the external wall of the building.

In a region between thermal insulation bodies arranged one on top of the other and the external wall 22 at least one insulation element 30 is positioned. This insulation element 30 can comprise an elastic and porous material, for example foam material, which can easily be introduced into the above-mentioned region and which reduces any air circulation in this region between the thermal insulation bodies and the external wall. Thus the thermal insulation properties are improved. Furthermore, in the case of a fire, the supply of oxygen to the source of fire is prevented. In addition, any issuing of toxic fumes is prevented. For example, the insulation element 30 can be of a tubular design, with the tube being elastically clamped between the respective thermal insulation body 30 and the external wall 22. As an alternative, the insulation element 30 can comprise an adhesive surface by means of which the insulation element 30 is bonded to the rear of the respective thermal insulation body 20. In both embodiments it must be ensured that the insulation element 30 at the fixing position is interrupted by the fixing plate 12 on the external wall 22.

Figure 3:
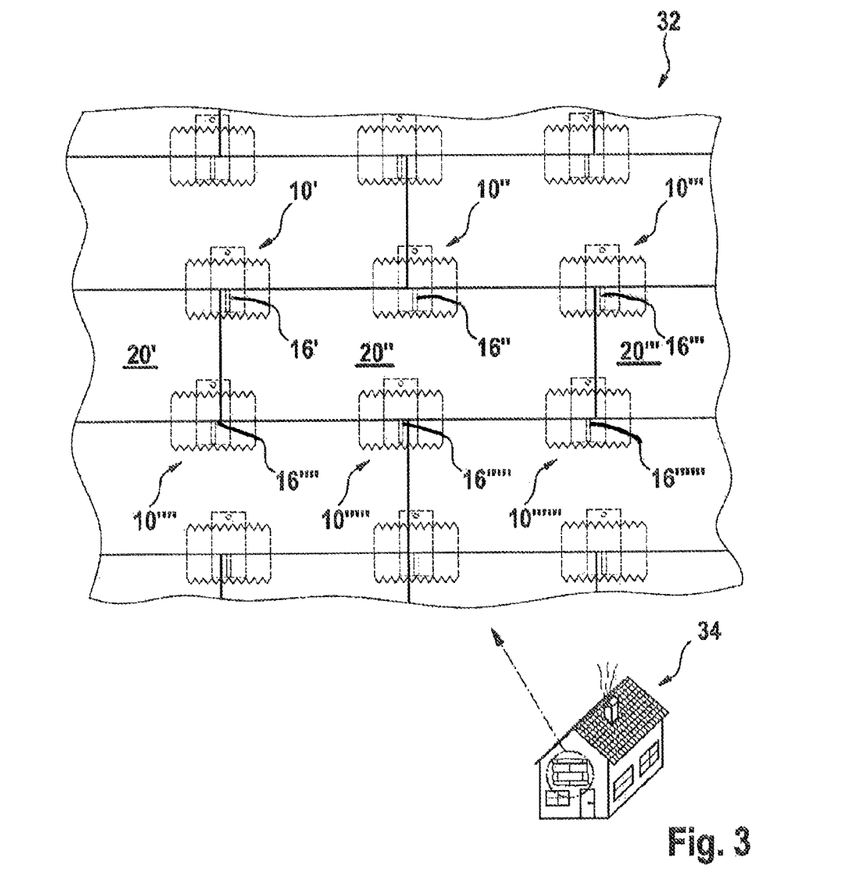
FIG. 3 a portion of a thermal insulation composite system fixed to the external wall of a building.

FIG. 3 shows a diagrammatic portion of a thermal composite system 32 that is installed on the external wall of a building 34. As shown in the figure, the individual thermal insulation bodies, which are cuboid in shape, are in each case arranged so as to be aligned with each other in the longitudinal direction. The thermal insulation bodies which in each case are arranged directly one on top of the other and one on the bottom of the other are arranged so as to be offset relative to each other. This prevents the formation of a vertical through-joint which would impede the thermal insulation properties of the thermal composite system 32. Although they are covered up by thermal insulation material, fixing devices 10"-10""' are diagrammatically shown which engage in, and fix to the external wall, respective thermal insulation bodies 20", 20" and 20'" arranged one beside the other and at the same time above and below the aforesaid.

As shown for example in the figure, three fixing devices 10", 10'" and 10"" are positioned in relation to a thermal insulation body 20" in an upper edge region thereof, and three fixing devices 10"", 10""" and 10"""" are positioned in relation to the thermal insulation body 20" at a lower edge region thereof. As a result of this arrangement the number of necessary fixing devices is further reduced.

In the arrangement between the fixing devices 10"-10"""" and the thermal insulation bodies 20", 20" and 20'" in relation to each other, positioning the connecting bridge 16", 16'", 16"" and 16"""" of the respective fixing devices 10", 10'", 10"" and 10"""" within the seam position (joint) between laterally adjoining thermal insulation bodies 20', 20" and 20'" is to be avoided. This ensures that even thermal insulation bodies that are arranged one beside the other adjoin seamlessly and without any gap, an arrangement which ensures good thermal insulation properties.

The thermal insulation composite system 32 can be installed simply, quickly and with reduced costs, and at the same time provides particularly outstanding thermal insulation properties because the individual thermal insulation bodies adjoin each other seamlessly without any gap. Thus heating energy costs of the building 34 can be reduced.

The invention claimed is:

1. A thermal insulation composite system, comprising a plurality of panel-shaped thermal insulation bodies and a plurality of fixing devices for fixing the thermal insulation bodies to at least one of an external wall, an internal wall, and a ceiling of a building, wherein
   each of the fixing devices contains a fixing plate for fixing the fixing device to the external wall, a connecting bridge mounted on a surface side of the fixing plate, and an insert plate that is fixed to the fixing plate via the connecting bridge in a plane substantially parallel to the fixing plate; and
   each of the thermal insulation bodies comprises at least one first slot that substantially corresponds to the thickness of the insert plate;
   wherein at least a first portion of the insert plate engages in the first slot of at least a first of the thermal insulation bodies; and
   the connecting bridge lengthwise completely engages in a second slot of the at least one first thermal insulation body, which second slot substantially corresponds to the thickness of the connecting bridge, that is incorporated in the thermal insulation body so as to be aligned perpendicularly to the first slot,
   wherein the thermal insulation composite system further comprises a support wedge that is designed to be placed between the fixing plate and the external wall of the building in order to set an angle between the fixing plate and the external wall of the building.

2. The thermal insulation composite system according to claim 1, in which the connecting bridge of the fixing device is designed, with complete engagement in the second slot of the at least one first thermal insulation body, to finish so as to be flush with a top of the at least one thermal insulation body.

3. The thermal insulation composite system according to claim 1, in which the connecting bridge of the fixing device, with complete engagement in the second slot of the at least one first thermal insulation body, comes to rest against the bottom of the second slot in the thermal insulation body.

4. The thermal insulation composite system according to claim 1, in which the length of the connecting bridge of the fixing device ranges between 4 cm and 6 cm.

5. The thermal insulation composite system according to claim 1, in which the insert plate is designed in such a manner that, with complete engagement of the at least first portion of the insert plate in the at least one first thermal insulation body, a second portion of the insert plate projects beyond an area of the thermal insulation body.

6. The thermal insulation composite system according to claim 5, in which the second portion of the insert plate is designed for relative engagement in a slot of at least one second thermal insulation body, which slot substantially corresponds to the thickness of the insert plate, which second thermal insulation body can be placed above or below the first thermal insulation body.

7. The thermal insulation composite system according to claim 1, in which the connecting bridge is designed so as to be plate-shaped.

8. The thermal insulation composite system according to claim 7, in which respective bottoms of at least two of the fixing plate, the plate-shaped connecting bridge and the insert plate are flush relative to each other, wherein the respective bottoms refer to a state of the fixing device, in which state said fixing device is fixed to the external wall.

9. The thermal insulation composite system according to claim 1, in which the distance between opposing surfaces of the fixing plate and the insert plate correspond to the length of the second slot in the thermal insulation body.

10. The thermal insulation composite system according to claim 1, in which the insert plate comprises triangular openings at a top and/or at a bottom, wherein the top and the bottom refer to a state in which the fixing device is fixed to the external wall.

11. The thermal insulation composite system according to claim 1, in which the connecting bridge comprises triangular openings at a bottom, wherein the bottom refers to a state in which the fixing device is fixed to the external wall.

12. The thermal insulation composite system according to claim 1, in which the fixing plate comprises at least one hole through which a fixing element for fixing the fixing device to the external wall can be inserted.

13. The thermal insulation composite system according to claim 1, in which the insert plate of the fixing device comprises through-holes for the removal of water vapour formed by water vapour diffusion.

14. The thermal insulation composite system according to claim 1, in which the fixing device comprises metal or plastic.

15. The thermal insulation composite system according to claim 1, in which the insert plate of the fixing device measures between 8 cm and 12 cm in length and between 4 cm and 6 cm in width.

16. The thermal insulation composite system according to claim 1, in which the connecting bridge of the fixing device is connected to the insert plate in the centre of said insert plate.

17. The thermal insulation composite system according to claim 1, in which the connecting bridge is connected to the insert plate so as to be offset between 1 cm and 2 cm relative to the centre of said insert plate.

18. The thermal insulation composite system according to claim 1, in which the thermal insulation body is manufactured from synthetic organic insulation materials, in particular polystyrene hard foam, polystyrene particle foam, polystyrene extruder foam, polyurethane hard foam and the like, or from synthetic inorganic insulation materials, in particular mineral wool, mineral foam, foam glass and the like.

19. The thermal insulation composite system according to claim 1, in which the plurality of thermal insulation bodies are arranged one on top of the other and one beside the other.

20. The thermal insulation composite system according to claim 19, further comprising at least one insulation element that is positioned in a region between the thermal insulation bodies, arranged one on top of the other and one beside the other, and the external wall.

21. The thermal insulation composite system according to claim 20, in which the insulation element is made from a tubular elastic material that is designed to be elastically clamped in a space between the thermal insulation body and the external wall of the building.

22. The thermal insulation composite system according to claim 20, in which the insulation element is made from an elastic material that at least on one side comprises an adhesive surface, wherein the insulation element is designed, by means of the adhesive surface, to be bonded to a surface of the thermal insulation body, which surface faces the external wall of the building.

* * * * *